US012061735B2

(12) United States Patent
Wang et al.

(10) Patent No.: US 12,061,735 B2
(45) Date of Patent: Aug. 13, 2024

(54) FIT GUIDANCE FOR HEAD-MOUNTABLE DEVICES

(71) Applicant: Apple Inc., Cupertino, CA (US)

(72) Inventors: Paul X. Wang, Cupertino, CA (US); Dustin A. Hatfield, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/213,777

(22) Filed: Jun. 23, 2023

(65) Prior Publication Data

US 2024/0004459 A1    Jan. 4, 2024

Related U.S. Application Data

(60) Provisional application No. 63/357,522, filed on Jun. 30, 2022.

(51) Int. Cl.
  *G06F 3/01* (2006.01)
  *G06F 1/16* (2006.01)
  *G06T 7/246* (2017.01)

(52) U.S. Cl.
  CPC .............. *G06F 3/012* (2013.01); *G06F 1/163* (2013.01); *G06F 3/013* (2013.01); *G06T 7/248* (2017.01); *G06T 2207/30201* (2013.01)

(58) Field of Classification Search
  CPC .............. G02B 27/017; G02B 27/0172; G02B 27/0176; G02B 2027/0178; G06F 3/012; G06F 3/013; G06F 3/011
  See application file for complete search history.

(56) References Cited

U.S. PATENT DOCUMENTS

| 10,845,845 | B2  |   | 11/2020 | Osman |
|------------|-----|---|---------|-------|
| 11,042,130 | B2  |   | 6/2021  | Aghara et al. |
| 11,551,376 | B2  | * | 1/2023  | Zachrisson ............... G06T 7/74 |
| 2019/0258442 | A1 | * | 8/2019  | Hudman ............ G02B 27/0176 |
| 2021/0080996 | A1 |   | 3/2021  | Hudman et al. |
| 2021/0263309 | A1 |   | 8/2021  | Rivera et al. |
| 2021/0271091 | A1 |   | 9/2021  | Xu et al. |
| 2022/0121237 | A1 |   | 4/2022  | Van Blon et al. |

OTHER PUBLICATIONS

Invitation to Pay Additional Fees from PCT/US2023/026230, dated Oct. 23, 2023, 9 pages.
International Search Report and Written Opinion from PCT/US2023/026230, dated Dec. 14, 2023, 14 pages.

\* cited by examiner

*Primary Examiner* — Koosha Sharifi-Tafreshi
(74) *Attorney, Agent, or Firm* — BAKERHOSTETLER

(57) ABSTRACT

A head-mountable device and/or another electronic device can provide guidance for optimal placement of the head-mountable device. The head-mountable device and/or another electronic device can be operated to guide a user to position the head-mountable device in a manner that will achieve proper alignment of components with respect to the user and maximize user comfort. For example, the head-mountable device and/or another device can include sensors for detecting features of the user's face, forces distributed on the face when worn, and/or alignment with the face (e.g., eyes). By further example, the head-mountable device and/or another device can detect changes in adjustment and infer user discomfort based on the frequency and/or magnitude of such changes. By further example, the head-mountable device and/or another device can detect changes in features of the user's face before, during, and/or after use of the head-mountable device.

8 Claims, 10 Drawing Sheets

FIT GUIDANCE FOR HEAD-MOUNTABLE DEVICES

CROSS-REFERENCE TO RELATED APPLICATION

This application claims the benefit of U.S. Provisional Application No. 63/357,522, entitled "FIT GUIDANCE FOR HEAD-MOUNTABLE DEVICES," filed Jun. 30, 2022, the entirety of which is incorporated herein by reference.

TECHNICAL FIELD

The present description relates generally to head-mountable devices, and, more particularly, to fit guidance for head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
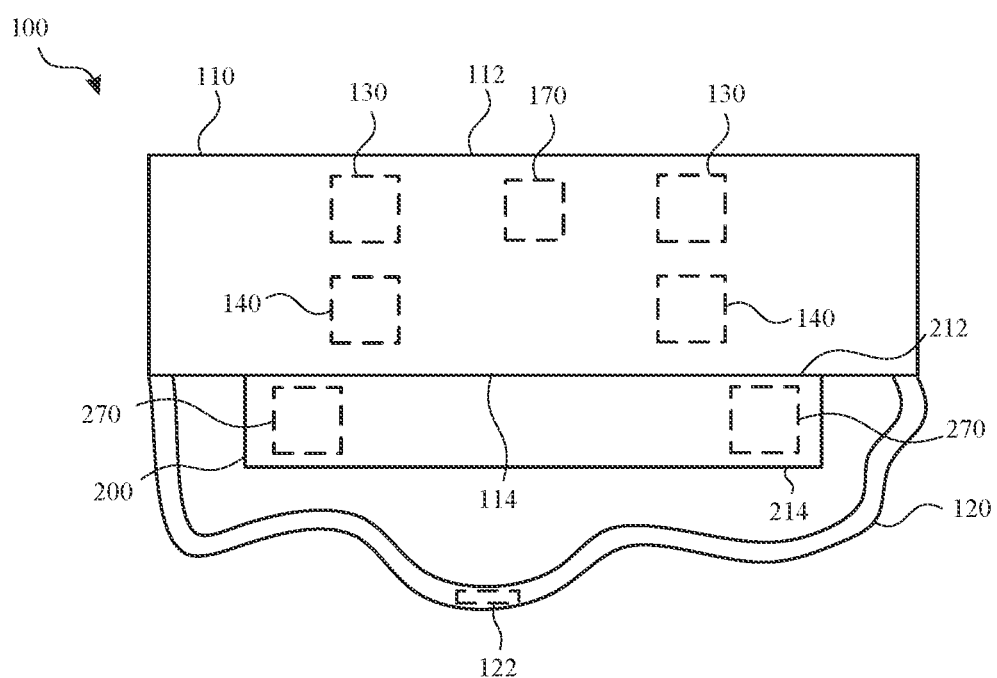
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

Many of the functions performed by a head-mountable device are optimally experienced when the components are in their most preferred position and orientation with respect to a user wearing the head-mountable device. For example, the head-mountable device can include a display that visually outputs display-based information toward the eyes of the user. The position and orientation of the displays relative to the eyes depends, at least in part, on how the head-mountable device is positioned on the face of the user.

Additionally, the head-mountable device, while on the face of the user, can provide greater comfort in particular positions than it would in other positions. For example, the placement may determine where and how the forces (e.g., weight and/or tension) of the head-mountable device are applied to the face. Face-engaging portions of the head-mountable device can be selected to engage certain portions of the face, but the experience by the user may be less than optimal if such face-engaging portions are placed at locations other than those intended. However, a head-mountable device with a more preferred placement can allow a user to comfortably wear and operate the head-mountable device for a longer duration.

A user or another person placing the head-mountable device on the face of the user may not recognize whether the head-mountable device is in the most optimal position to achieve these results. Accordingly, it can be desirable to provide guidance and/or feedback to the user to assist with placement of the head-mountable device in a preferred position.

Systems of the present disclosure can provide a head-mountable device with interface elements to provide guidance for optimal placement of a head-mountable device. The head-mountable device and/or another electronic device can be operated to guide a user to position the head-mountable device in a manner that will achieve proper alignment of components with respect to the user and maximize user comfort. For example, the head-mountable device and/or another device can include sensors for detecting features of the user's face, forces distributed on the face when worn, and/or alignment with the face (e.g., eyes). By further example, the head-mountable device and/or another device can detect changes in adjustment and infer user discomfort based on the frequency and/or magnitude of such changes. By further example, the head-mountable device and/or another device can detect changes in features of the user's face before, during, and/or after use of the head-mountable device.

These and other embodiments are discussed below with reference to FIGS. 1-14. However, those skilled in the art will readily appreciate that the detailed description given herein with respect to these Figures is for explanatory purposes only and should not be construed as limiting.

According to some embodiments, for example as shown in FIG. 1, a head-mountable device 100 includes a frame 110 and a light seal 200. The frame 110 can be worn on a head of a user. The frame 110 can be positioned in front of the eyes of a user to provide information within a field of view of the user. The frame 110 and/or the light seal 200 can provide nose pads and/or other portions to rest on a user's nose, forehead, cheeks, and/or other facial features as described further herein.

The frame 110 can be supported on a user's head with the head engager 120. The head engager 120 can wrap around or extend along opposing sides of a user's head. The head engager 120 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the head engager 120 can include multiple components to engage a user's head. The head engager 120 can extend from the frame 110 and/or the light seal 200.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110, it will be understood that some or all of these components can be located anywhere within or on the head-mountable device 100. For example, one or more of these components can be positioned within the head engager 120, the light seal 200, and/or the frame 110 of the head-mountable device 100.

The head-mountable device 100 can include one or more user sensors for tracking features of the user wearing the head-mountable device 100. Such a sensor can be located at, included with, and/or associated with the frame 110, the light seal 200, and/or the head engager 120. For example, a user sensor can include or accompany an HMD sensor 170, a pressure sensor 270 of the light seal 200, and/or a head engagement sensor 122 of the head engager.

One or more sensors can be provided to detect a fit of the light seal 200 with respect to a face of a user. For example, the frame 110 and/or another component of the head-mountable device 100 can include a light sensor for detecting light within the light seal 200, as described further herein. By further example, the light seal 200 and/or another component of the head-mountable device 100 can include a pressure sensor 270 for detecting forces applied to regions of the face of the user, as described further herein. By further example, the head engager 120 and/or another component of the head-mountable device 100 can include a head engagement sensor 122 for detecting tension in or another condition of the head engager 120. Operation of such sensors can facilitate determination of which of a variety of light seals is recommended for user by a particular user.

By further example, a user sensor can perform facial feature detection, facial movement detection, facial recognition, eye tracking, user mood detection, user emotion detection, voice detection, etc. Such eye tracking may be used to determine a location of information to be displayed on the displays 140 and/or a portion (e.g., object) of a view to be analyzed by the head-mountable device 100. By further example, the user sensor can be a bio-sensor for tracking biometric characteristics, such as health and activity metrics. The user sensor can include a bio-sensor that is configured to measure biometrics such as electrocardiographic (ECG) characteristics, galvanic skin resistance, and other electrical properties of the user's body. Additionally or alternatively, a bio-sensor can be configured to measure body temperature, exposure to UV radiation, and other health-related information.

The frame 110 can include and/or support one or more cameras 130. The cameras 130 can be positioned on or near an outer side 112 of the frame 110 to capture images of views external to the head-mountable device 100. As used herein, an outer side of a portion of a head-mountable device is a side that faces away from the user and/or towards an external environment. The captured images can be used for display to the user or stored for any other purpose. Each of the cameras 130 can be movable along the outer side 112. For example, a track or other guide can be provided for facilitating movement of the camera 130 therein.

The head-mountable device 100 can include displays 140 that provide visual output for viewing by a user wearing the head-mountable device 100. One or more displays 140 can be positioned on or near an inner side 114 of the frame 110. As used herein, an inner side 114 of a portion of a head-mountable device is a side that faces toward the user and/or away from the external environment.

A display 140 can transmit light from a physical environment (e.g., as captured by a camera) for viewing by the user. Such a display 140 can include optical properties, such as lenses for vision correction based on incoming light from the physical environment. Additionally or alternatively, a display 140 can provide information as a display within a field of view of the user. Such information can be provided to the exclusion of a view of a physical environment or in addition to (e.g., overlaid with) a physical environment.

A physical environment relates to a physical world that people can sense and/or interact with without necessarily requiring the aid of an electronic device. A computer-generated reality environment relates to a wholly or partially simulated environment that people sense and/or interact with the assistance of an electronic device. Examples of computer-generated reality include mixed reality and virtual reality. Examples of mixed realities can include augmented reality and augmented virtuality. Some examples of electronic devices that enable a person to sense and/or interact with various computer-generated reality environments include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable device can have an integrated opaque display, have a transparent or translucent display, or be configured to accept an external opaque display (e.g., smartphone).

While the light seal 200 is shown schematically with a particular size and shape, it will be understood that the size and shape of the light seal 200, particularly at the inner side 214 of the light seal 200, can have a size and shape that accommodates the face of a user wearing the head-mountable device 100. For example, the inner side 214 can provide a shape that generally matches the contours of the user's face around the eyes of the user, as described further herein. The inner side 214 can be provided with one or more features that allow the light seal 200 to conform to the face of the user to enhance comfort and block light from entering the light seal 200 at the points of contact with the face. For example, the inner side 214 can provide a flexible, soft, elastic, and/or compliant structure.

While the head-mountable device 100 is worn by a user, with the inner side 214 of the light seal 200 against the face of the user and/or with the head engager 120 against the head of the user, the light seal 200 can remain in a fixed location and orientation with respect to the face and head of the user. Furthermore, in such a configuration the frame 110 can also be maintained in a fixed location and orientation with respect to the face and head of the user. Given the variety of head and face shapes that different users may have, it can be desirable to provide a light seal 200 with customization and exchangeability so that the frame 110 is in a desired position and orientation with respect to the face and head of the user during use.

Figure 2:
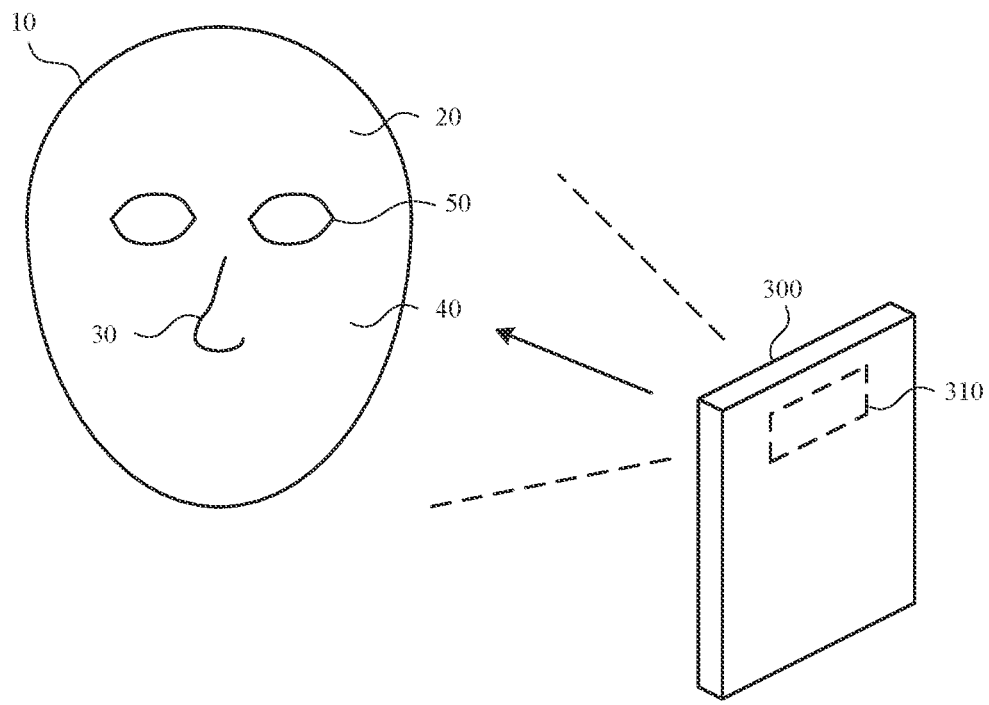
FIG. 2 illustrates a perspective view of an electronic device in use to measure distances to different face regions of a user, according to some embodiments of the present disclosure.

Referring now to FIG. 2, the shape of a user's face can be measured to later determine how a given head-mountable device should be positioned to optimize user comfort and alignment with features of the user's face. A device having a sensor can be operated to detect and/or measure one or more regions of a face of a user. Such detections and measurements can be used to determine how a head-mountable device should be positioned so that the light seal thereof comfortably engages the appropriate regions of the user's face. Such detections and measurements can also be used as a baseline of the user's initial condition(s) against which additional detections and measurements can be compared.

As shown in FIG. 2, an electronic device 300 can provide a external sensor 310 that is operable to measure distances to multiple regions of the face 10. Such regions can include the regions that would be engaged by a light seal when a head-mountable device is worn by the user. For example, the regions can include a forehead 20, a nose 30, one or both eyes 50, and/or one or both cheeks 40.

The external sensor 310 can include one or more types of sensors. For example, the external sensor 310 can include one or more image sensors, depth sensors, thermal (e.g., infrared) sensors, and the like. By further example, a depth sensor can be configured to measure a distance (e.g., range) to an object (e.g., region of the user's face) via stereo triangulation, structured light, time-of-flight, interferometry, and the like. Additionally or alternatively, the external sensor 310 and/or the device can capture and/or process an image based on one or more of hue space, brightness, color space, luminosity, and the like.

In FIG. 2, by way of example, the external sensor 310 is depicted as a component of an electronic device. Examples of such an electronic device include a portable computing device, a tablet device, a laptop computer, a smartphone, a smart watch, or other appropriate devices that include one or more sensors. Additionally or alternatively, the external sensor 310 can be a component of a head-mountable device, such as the head-mountable device to be worn by the user and/or another head-mountable device. In some embodiments, the electronic device 300 can be maintained at a fixed location with respect to the face 10, or the electronic device can be moved to map different regions of the face of the user.

The external sensor 310 can measure a distance from the external sensor 310 to each of multiple regions of the face of the user. For example, the external sensor 310 can measure a distance to a forehead 20, a distance to a nose 30, a distance to a cheek 40, and the like. The external sensor 310 can measure any other regions of the face, such as the eyes and/or other portions that are not to be directly engaged by the light seal. It will be understood that other regions of the face can be detected and/or measured. Additionally or alternatively, one or multiple distance measurements can be made to each of various regions, such as with respect to multiple sections of the forehead 20, nose 30, and/or cheeks 40. Based on the distance measurements, a head-mountable device can be selected with, optionally, a custom light seal that is selected with various portions that match the contours of the face of the user.

Figure 3:
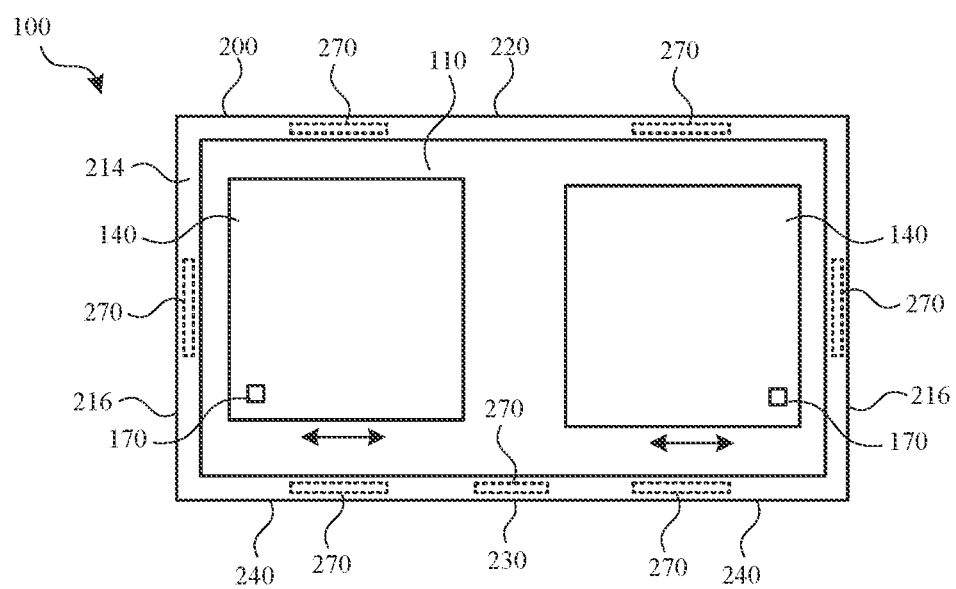
FIG. 3 illustrates a perspective view of an electronic device in use to detect conditions of a head-mountable device worn by a user, according to some embodiments of the present disclosure.

Referring now to FIG. 3, a head-mountable device can include a light seal that is selected to match the contours of the face of the user. The head-mountable device can further include features to monitor alignment and engagement of the head-mountable device on the face of the user.

For example, as shown in FIG. 3, a light seal 200 can include a forehead portion 220 for engaging the forehead of the user, a nose portion 230 for engaging the nose of the user, and cheek portions 240 for engaging the cheeks of the user. By further example, the light seal 200 can further include side portions 216 configured to engage side of the user's face (e.g., along the temples of the user's head). Any number of other portions can be provided, including sub-components of the portions described herein. Different light seals can differ from each other at least with respect to the dimensions along different portions thereof. For example, different light seals can have different thicknesses along different portions to accommodate the face of various different users. A given light seal can be selected for use with a given user having facial features for engagement by the light seal, and a target position of the head-mountable device can be determined for optimal comfort and/or alignment (e.g., with the eyes of the user).

While the head-mountable device 100 can have a target alignment for the entire device, certain features of the head-mountable device 100 can adjust their respective position and/or orientation to align with features of the user. For example, each display 140 can be adjusted to align with a corresponding eye of the user. By further example, each display 140 can be moved along one or more axes until a center of each display 140 is aligned with a center of the corresponding eye. Accordingly, the distance between the displays 140 can be set based on an interpupillary distance of the user. IPD is defined as the distance between the centers of the pupils of a user's eyes.

The pair of displays 140 can be mounted to the frame 110 and separated by a distance. The distance between the pair of displays 140 can be designed to correspond to the IPD of a user. The distance can be adjustable to account for different IPDs of different users that may wear the head-mountable device 100. For example, either or both of the displays 140 may be movably mounted to the frame 110 to permit the displays 140 to move or translate laterally to make the distance larger or smaller. Any type of manual or automatic mechanism may be used to permit the distance between the displays 140 to be an adjustable distance. For example, the displays 140 can be mounted to the frame 110 via slidable tracks or guides that permit manual or electronically actuated movement of one or more of the displays 140 to adjust the distance there between.

Additionally or alternatively, the displays 140 can be moved to a target location based on a desired visual effect that corresponds to user's perception of the display 140 when it is positioned at the target location. The target location can be determined based on a focal length of the user and/or optical elements of the system. For example, the user's eye and/or optical elements of the system can determine how the visual output of the display 140 will be perceived by the user. The distance between the display 140 and the user's eye and/or the distance between the display 140 and one or more optical elements can be altered to place the display 140 at, within, or outside of a corresponding focal distance. Such adjustments can be useful to accommodate a particular user's eye, corrective lenses, and/or a desired optical effect.

It will be understood that placement the entire head-mountable device can also alter the position and/or orientation of the displays 140 with respect to the eyes of the user. As such, the head-mountable device can provide guidance to help a user achieve alignment of the head-mountable device with respect to the user while also performing additional adjustments, such as movement of the displays 140.

A light seal or other component of the head-mountable device can also include sensors that are operated to detect and/or measure one or more forces on the face of a user. Such detections and measurements can be used to determine alignment and fit of the head-mountable device of the face of the user.

As shown in FIG. 3, a light seal 200 or other component of the head-mountable device 100 can provide pressure sensors 270 that are operable to measure magnitudes of forces applied to multiple regions of the face of a user. Such regions can include the regions that are engaged by the light seal 200 as the head-mountable device 100 is worn by the user. For example, the regions can include a forehead, a nose, and/or one or both cheeks. Accordingly, the pressure sensors 270 can be positioned at the forehead portion 220, the side portions 216, the nose portion 230, and/or the cheek portions 240.

The pressure sensors 270 can include one or more types of sensors. The pressure sensors 270 can include a component that converts mechanical motion and/or deformation of the light seal 200 into an electric signal. The pressure sensor 270 can include one or more force sensors, contact sensors, capacitive sensors, strain gauges, resistive touch sensors, piezoelectric sensors, cameras, pressure sensors, photodiodes, and/or other sensors. The pressure sensor 270 can detect both the presence and magnitude of a force, as well as a known distribution of that force across a given area.

Each of the pressure sensors 270 can measure a pressure (i.e., force distributed across an area) applied to the face of the user at its vicinity. For example, the pressure sensors 270 can measure a pressure and/or a force applied to the forehead, nose, cheeks, and/or temples of the user. It will be understood that other regions of the face where contact is made can be detected and/or measured. Additionally or alternatively, one or multiple measurements can be made to each of various regions, such as with respect to multiple sections of the forehead, nose, and/or cheeks.

Based on the pressure and/or force measurements, adjustments to the head-mountable device may be determined to be recommended. For example, a target alignment can be one in which the forces at different regions are evenly distributed or otherwise balanced. By further example, where pressure and/or force are measured to be excessively high in a given region (e.g., above a threshold associated with the limit of a user's comfort range at that region), an adjustment can be recommended. It will be understood that the threshold for one region of the user's face can be different than the threshold for another region of the user's face. For example, a threshold within which a forehead of a particular user can comfortably withstand pressures and/or forces may be greater than a threshold within which a cheek of the user can comfortably withstand pressures and/or forces. As such, adjustments can be recommended to alleviate a pressure and/or a force in one region by shifting them to another region. By further example, recommended adjustments can include adjusting the tension of a head engager.

Figure 4:
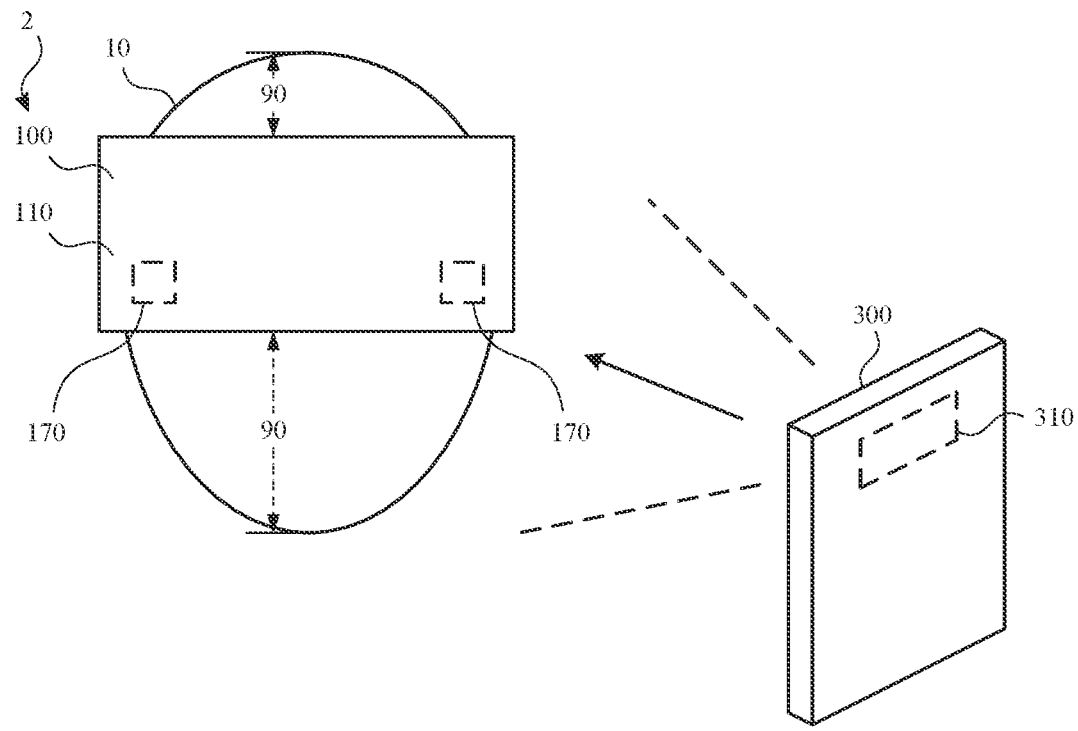
FIG. 4 illustrates a perspective view of an electronic device in use to detect conditions of a head-mountable device worn by a user, according to some embodiments of the present disclosure.
Figure 5:
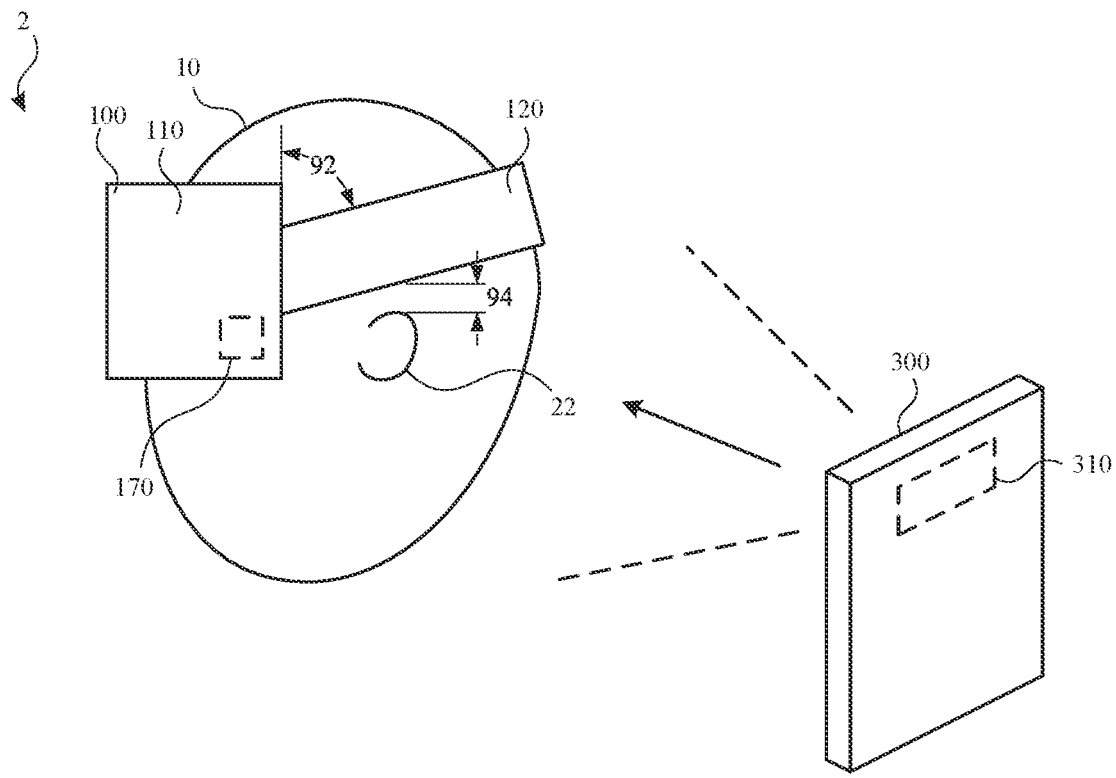
FIG. 5 illustrates a perspective view of an electronic device in use to detect conditions of face regions of a user following use of a head-mountable device, according to some embodiments of the present disclosure.

Referring now to FIGS. 4 and 5, a head-mountable device can provide a user interface on another electronic device to prompt and/or guide adjustment the head-mountable device to achieve a target alignment.

As shown in FIG. 4, a system 2 can include a head-mountable device 100 and, optionally, an electronic device 300 that is separately operable from the head-mountable device 100. The electronic device 300 can provide an external sensor 310, such as a camera that captures an image of the head-mountable device 100 and/or a user (not shown). In some embodiments, the electronic device 300 can include one or more image sensors, depth sensors, thermal (e.g., infrared) sensors, and the like. In some embodiments, the external sensor 310 can be operated to detect an alignment of the head-mountable device 100 on the face 10 of the user. For example, based on a known structure of the head-mountable device 100 (e.g., with fiducial markers), the electronic device 300 can determine the position and/or orientation of the entire head-mountable device 100. Additionally or alternatively, the electronic device 300 can measure distances 90 between the head-mountable device 100, such as the frame 110 and/or the light seal (not labelled in FIG. 5) and/or one or more regions of the face 10 of the user. For example, the distance 90 between the frame 110 and/or the light seal and one or more regions of the face (e.g., chin, cheeks, temples, crown, and the like) can be determined. Based on a prior scan of the user's face and the selected light seal, the alignment can be compared to a target alignment to determine whether the head-mountable device is being worn in a preferred arrangement.

As shown in FIG. 5, the electronic device 300 can be operated (e.g., with the external sensor 310) to detect an alignment of the head-mountable device 100 on other regions of the face of the user. For example, a distance 94 between the head engager 120 and the ear 22 can be determined. The alignment can be compared to a target alignment to determine whether the head-mountable device 100 is being worn in a preferred arrangement. By further example, an angle 92 between the head engager 120 and the frame 110 can be determined. The angle 92 can be compared to a target angle to determine whether the head-mountable device 100 is being worn in a preferred arrangement.

In some embodiments, a distance, angle, or other feature can be detected by an HMD sensor 170 of the head-mountable device 100. For example, the HMD sensor 170 can detect the distance 90 between the head-mountable device 100 and/or one or more regions of the face 10 of the user. By further example, the HMD sensor 170 can detect the distance 94 between the head engager 120 and the ear 22. By further example, the HMD sensor 170 can detect the angle 92 between the head engager 120 and the frame 110.

In some embodiments, a feature of the face 10 can be detected by the HMD sensor 170 and/or the external sensor 310. For example, the HUD sensor 170 and/or the external sensor 310 can detect a distortion of the face 10, such as a change in the contour and/or shape of the face 10 upon application of the head-mountable device. Such changes can be recognized as stretching, bunching, pulling, compressing, displacing, and manipulating tissue of the face 10, which may lead to discomfort of the user. Such changes can be tracked as changes (e.g., movement) of the skin or other tissue relative to an initial condition of the face 10. Where such changes exceed one or more corresponding thresholds, the head-mountable device 100 and/or the electronic device 300 can provide an output, as described further herein.

Based on the detected position and/or orientation of the head-mountable device 100 and/or other conditions thereof with respect to the user, the electronic device 300 and/or the head-mountable device 100 can compare the current alignment with a target alignment. Based on the results of the comparison, the electronic device 300 and/or the head-mountable device 100 can determine a recommended adjustment.

Figure 6:
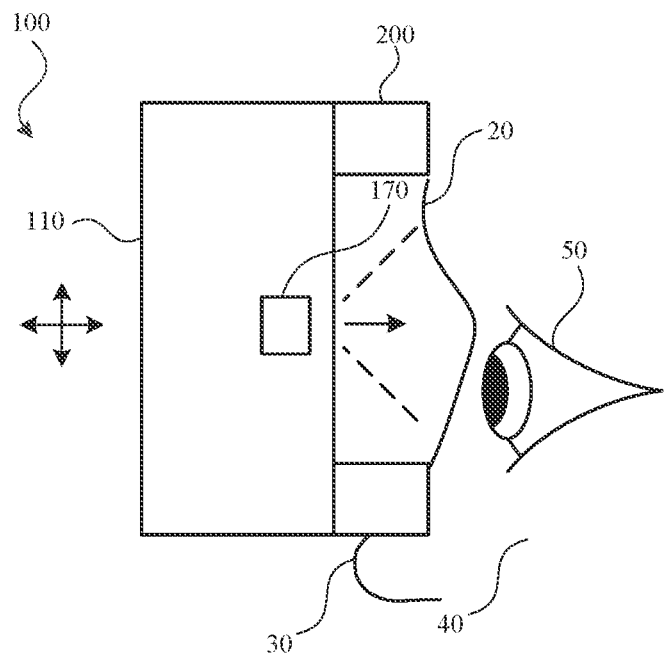
FIG. 6 illustrates a rear view of a head-mountable device, according to some embodiments of the present disclosure.

As shown in FIG. 6, the head-mountable device 100 can detect an alignment while worn by the user. For example, the HMD sensor 170 can detect and/or track the eye 50 of the user. Based on a detected position and/or orientation of the eye 50 with respect to the HMD sensor 170, a position and/or orientation of the head-mountable device 100 can be determined with respect to the face of the user. Additionally or alternatively, such detections can be performed with respect to the forehead 20, the nose 30, the cheeks 40, and/or other portions of the user. In some embodiments, the engagement of the light seal 200 against such portions can be detected either by changes in the portions of the user (as described herein) and/or changes in the light seal 200 (e.g., compression).

Figure 7:
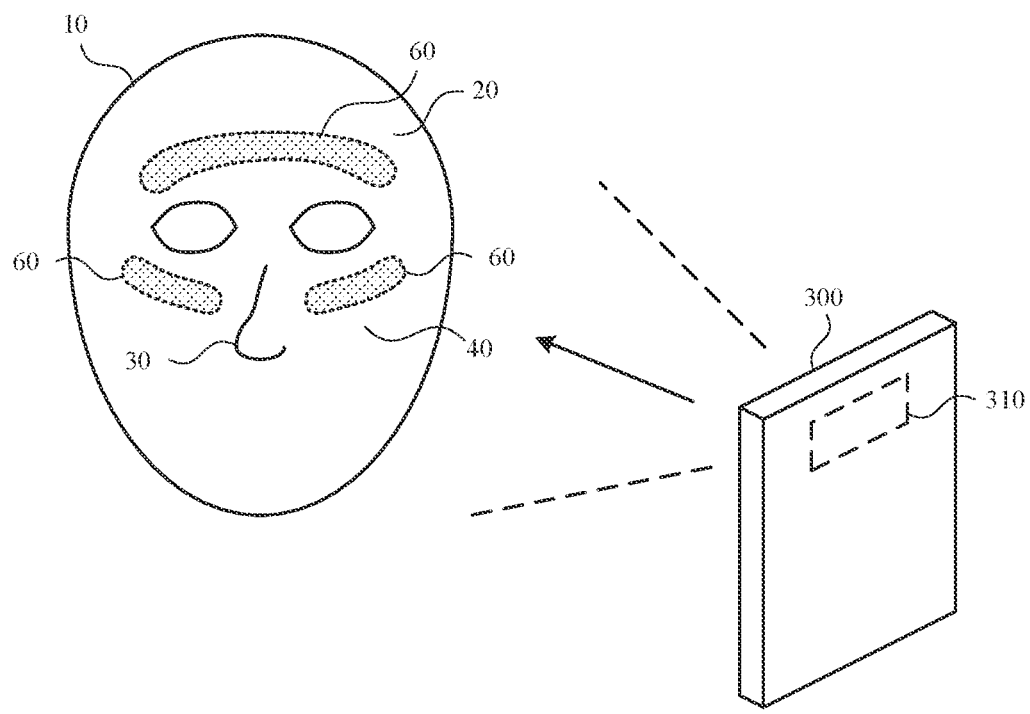
FIG. 7 illustrates a side view of a head-mountable device in use to detect conditions of face regions of a user, including an eye, according to some embodiments of the present disclosure.

Referring now to FIG. 7, an electronic device 300 can be operated to detect conditions and/or features of a face can following use of a head-mountable device. For example, as shown in FIG. 7, the face 10 of the user can be scanned after the head-mountable device (not shown) has been removed from the face. While applied to the face, the head-mountable device may have deformed and/or manipulated the face of the user temporarily. For a period of time following removal of the head-mountable device, conditions may provide indications of the effects incurred. For example, as the tissue of the face 10 response to the removal of the head-mountable device, additional blood flow may be provided to regions that were previously compressed by the head-mountable device (e.g., pressure from the light seal). Such conditions can be optically, thermally, or otherwise detectable, such as by the external sensor 310 of the electronic device 300 and/or another electronic device. For example, the face 10 may demonstrate affected regions 60 at various portions of the face 10, such as at the forehead 20, the nose 30, and/or the cheeks 40. The detections made after removal of the head-mountable device can be compared to the detections made prior to application of the head-mountable device. Changes can include a change in color, hue, tint, topography, contours, texture, thermal conditions (e.g., temperature) and the like. Such changes can be measured and/or quantified based on optical, thermal, distance, and/or other measurements. A change between an initial condition (i.e., prior to application of the head-mountable device) and a final condition (i.e., after removal of the head-mountable device) can be compared to a threshold. Where the magnitude of the change exceeds the threshold, an adjustment can be recommended. It will be understood that such changes can be intended to reduce the magnitude of the changes and/or to more evenly distribute the changes.

Figure 8:
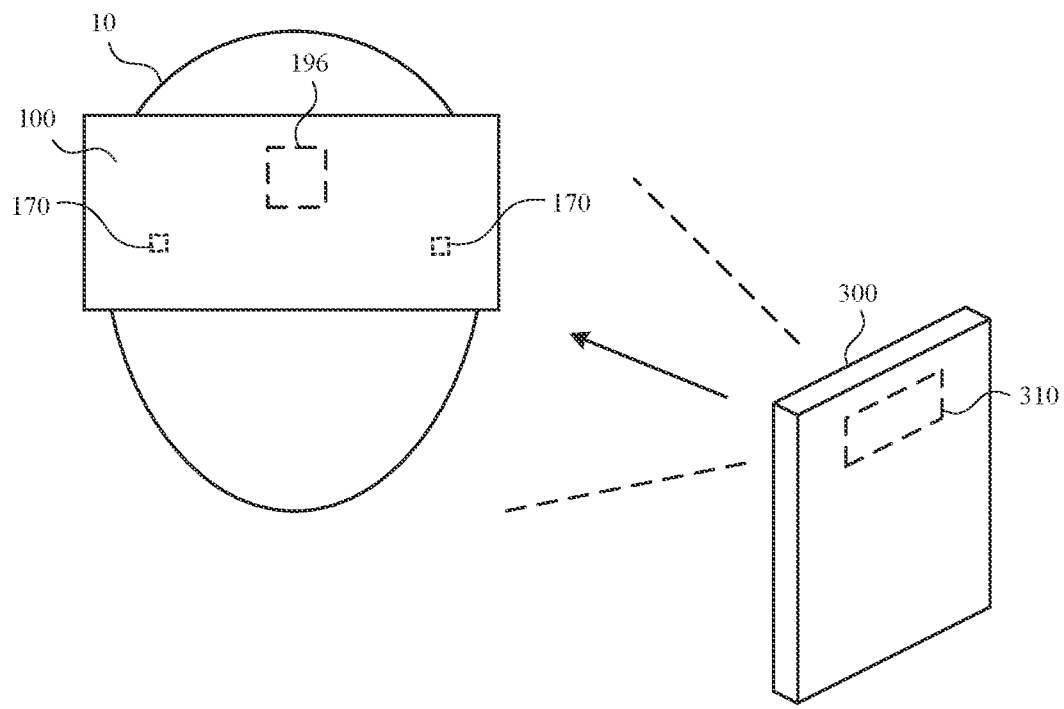
FIG. 8 illustrates a perspective view of an electronic device and a head-mountable device in use to detect conditions of the head-mountable device worn by a user, according to some embodiments of the present disclosure.
Figure 9:
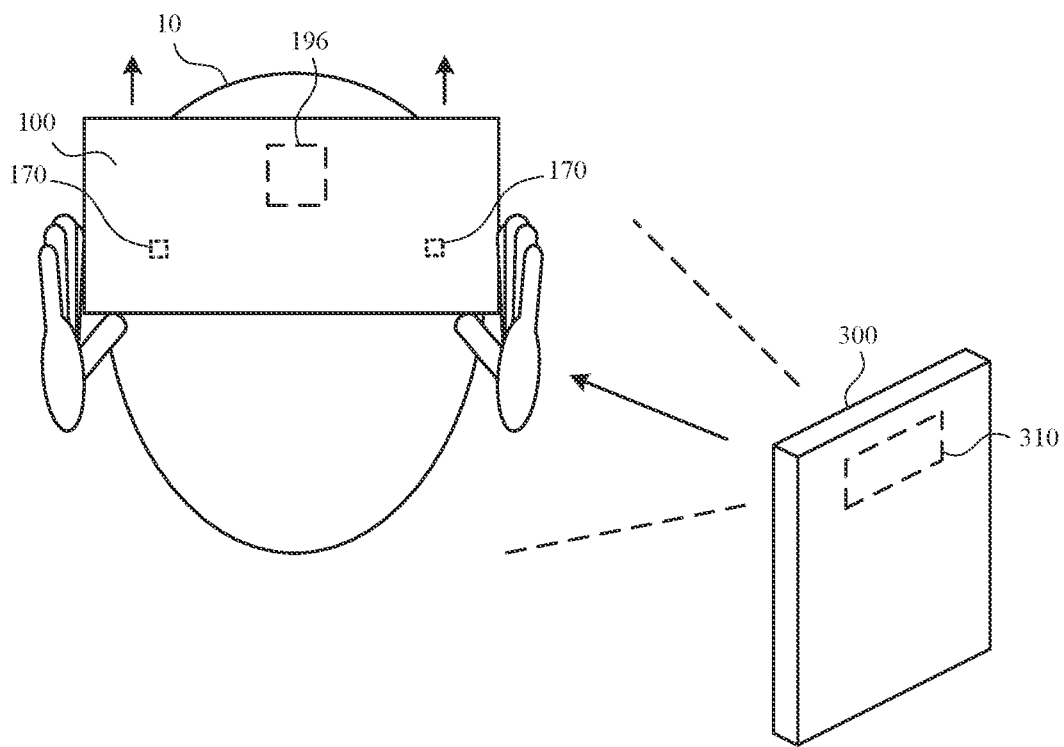
FIG. 9 illustrates a perspective view of the electronic device and the head-mountable device of FIG. 8 in use to detect conditions of the head-mountable device worn by the user, according to some embodiments of the present disclosure.

Referring now to FIGS. 8 and 9, changes made to the alignment of the head-mountable device can be detected and tracked across a period of time. For example, as shown in FIG. 8, a head-mountable device 100 can have an initial position and/or orientation with respect to a face 10 of a user.

As shown in FIG. 9, the user can manually and/or otherwise adjust the position and/or orientation of the head-mountable device 100 with respect to the face 10 of the user. Such an adjustment can be made at the discretion of the user at any time during usage of the head-mountable device 100. The head-mountable device 100 and/or an electronic device 300 can be operated to detect and/or track such adjustments across period of time.

For example, the head-mountable device 100 can detect the position and/or orientation thereof by one or more onboard sensors. For example, the head-mountable device 100 can include an initial measurement unit 196 ("IMU") that provides information regarding a characteristic of the head-mountable device 100, such as inertial angles thereof. For example, the IMU 196 can include a six-degrees of freedom IMU that calculates the head-mountable device's position, velocity, and/or acceleration based on six degrees of freedom (x, y, z, $\theta_x$, $\theta_y$, and $\theta_z$). The IMU 196 can include one or more of an accelerometer, a gyroscope, and/or a magnetometer. Additionally or alternatively, the head-mountable device 100 can detect motion characteristics of the head-mountable device 100 with one or more other motion sensors, such as an accelerometer, a gyroscope, a global positioning sensor, a tilt sensor, and so on for detecting movement and acceleration of the head-mountable device 100. Additionally or alternatively, the HMD sensor 170 can be operated to detect relative movements with respect to the face (e.g., eyes) of the user. By further example, the external sensor 310 of the electronic device 300 can be operated to detect movement of the head-mountable device 100 with respect to the face 10 of the user.

Frequent and/or significant adjustments to the alignment of the head-mountable device 100 with respect to the face can of the user can indicate a poor fit of the head-mountable device 100. For example, the user may tend to adjust the head-mountable device 100 based on slippage of its alignment with respect to the face 10. By further example, the user may tend to adjust the head-mountable device 100 based on an excessively tight fit and/or pressure applied to the face 10 of the user. When the frequency and/or magnitude of adjustments of the head-mountable device 100 with respect to the face 10 of the user exceeds a threshold, the head-mountable device 100 and/or the electronic device 300 can determine a recommended adjustment.

Figure 10:
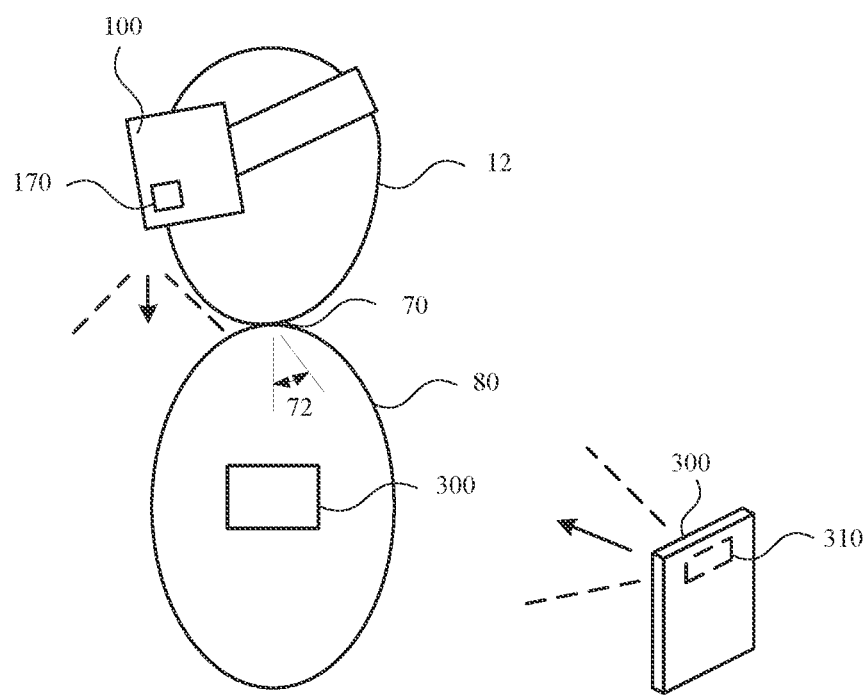
FIG. 10 illustrates a perspective view of an electronic device and a head-mountable device in use to detect conditions of the head-mountable device worn by a user, according to some embodiments of the present disclosure.

Referring now to FIG. 10, other features of the user can be detected and applied to infer various levels of user comfort. As shown in FIG. 10, the head-mountable device 100 can be worn on a face 10 of the user. The face 10 of the user can form an angle 72 with respect to the torso 80 or another body portion of the user. For example, the user can pivot the face 10 at the neck 70 to adjust the angle 72. It will be understood that the body portions for comparison can be any two or more body portions. The head-mountable device 100 can be operated independently and/or in concert with one or more electronic devices 300. For example, an electronic device 300 can be worn on the torso 80 or other body portion of the user. By further example, an electronic device 300 can be one that is not worn by the user, but is otherwise positioned in a vicinity of the user and/or the head-mountable device 100. The head-mountable device 100 and/or the one or more electronic devices 300 can monitor their own conditions and/or conditions of each other and/or the user.

Additionally or alternatively, one or more HMD sensors 170 of the head-mountable device 100 can be operated to detect conditions of the user, including conditions of other portions of the user's body, such as the torso 80 and/or the neck 70. Such sensors can be directed toward areas of interest, including outwardly from the head-mountable device 100.

Detections made with respect to the user can be performed to infer a level of a user's comfort and/or discomfort. For example, certain angles of the user's neck can lead to discomfort, and such angles when detected can be a basis for recommending an adjustment to the head-mountable device 100. By further example, the motion of the user can be detected to infer activity of the user. For example, the rise and fall of the chest at the torso 80 can be detected to determine rapid breathing and/or anxiety of the user. By further example, features of the user's eye can be detected to infer an emotional state of the user. By further example, a microphone of the head-mountable device 100 and/or an electronic device 300 can be operated to detect audible output provided by the user.

The detectable conditions described herein can be indicative of a physical and/or emotional state of the user. Such detections, alone or in combination, can be performed to infer other conditions of the user, such as a state of distress, soreness, discomfort, eyestrain, dizziness, nausea, awareness, alertness, anxiety, mood, and the like. Such detections can provide a basis for recommending an adjustment to the head-mountable device.

In some embodiments, the electronic device 300 can be in communication with the head-mountable device 100, such that detections and/or recommended adjustments can be determined by the head-mountable device 100 and transmitted to the electronic device 300. It will be understood that detections of the head-mountable device 100 and the electronic device 300 can be combined to determine a recommended adjustment.

The electronic device 300 and/or the head-mountable device 100 can include a display that outputs a user interface. It will be understood that the electronic device 300 can be operated by a person that is not the user wearing the head-mountable device. As such, the additional person can receive guidance to assist the user with any recommended adjustments.

The display can output one or more visual elements. For example, the display can include an indicator, such as arrows, a compass, a heatmap, a reticle, crosshairs, a point, a line, and the like. The indicator can be an instruction to move the head-mountable device 100 in a particular manner. For example, where the head-mountable device 100 is not in a target alignment, the indicator can show the direction in which the user should move the head-mountable device 100 to achieve the target alignment.

Other types of output can be provided to prompt a user to make adjustments. For example, the outputs can include instructions to move the head-mountable device in a particular way. Additionally or alternatively, content can be remove or modified until the user makes the recommended adjustment. For example, visual elements can be presented as blurry, blocked, occluded, dim, and/or transparent until the user makes the recommended adjustment. Additionally or alternatively, content can be added or modified until the user makes the recommended adjustment. For example, visual elements can be presented as highlighted, opaque, and/or brighter until the user makes the recommended adjustment.

It will be understood that adjustments of a user interface as described herein can be repeated as needed to achieve different target alignments after successive durations of time. As such, the outputs can be dynamically updated based on multiple detections and determinations as described herein.

It will be further understood that the objective of adjusting a current alignment and/or achieving a target alignment can include multiple stages. For example, the user can be prompted to perform a sequence of adjustments to achieve each of different target alignments.

It will be further understood that such measures can be temporary. For example, the user can be prompted to take certain actions. Thereafter, the user can resume operation according to a prior mode until adjustments are again determined to be recommended.

Other recommendations can include adjusting a fit and/or configuration of the head-mountable device 100. The head-mountable device 100 can recommend that the user adjust the fit, position, orientation, and/or tightness of the head-mountable device 100 on the head of the user. For example, the recommended adjustment can be to a tightness of the head engager.

By further example, the head-mountable device 100 can recommend that the user adjust the head-mountable device 100 to provide a different effect on the user. Such adjustments can include exchanging components, removing components, and/or adding components, such as a counterbalance to adjust the weight distribution of the head-mountable device 100. In some embodiments, the recommended adjustment can include changing the light seal for a different light seal to provide different engagement on the face of the user.

Figure 11:
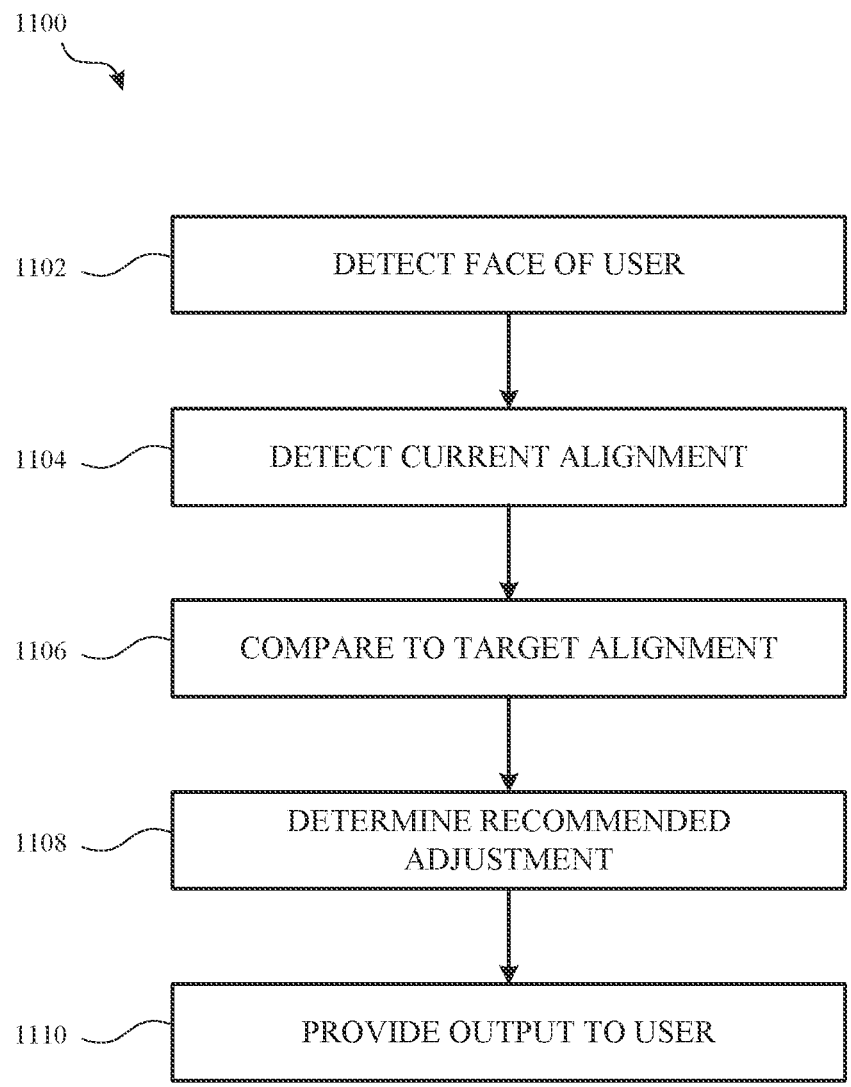
FIG. 11 illustrates a flow chart for a process having operations performed by a head-mountable device and/or an electronic device, according to some embodiments of the present disclosure.

FIG. 11 illustrates a flow diagram of an example process 1100 for guiding a user with adjustment assistance. For explanatory purposes, the process 1100 is primarily described herein with reference to the head-mountable device 100 of FIGS. 1, 3-6, and 8-10 and/or the electronic device 300 of FIGS. 2, 4, 5, and 7-10. However, the process 1100 is not limited to the head-mountable device 100 of FIGS. 1, 3-6, and 8-10 and/or the electronic device 300 of FIGS. 2, 4, 5, and 7-10, and one or more blocks (or operations) of the process 1100 may be performed by different components of the head-mountable device and/or one or more other devices. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

The process 1100 can begin when the head-mountable device and/or an electronic device detects a face of a user (1102). Such a detection can be made by one or more sensors of the head-mountable device and/or the electronic device. Additionally or alternatively, the detection can be performed in response to an operational state of the head-mountable device (e.g., on/off state, application launch, user input command, and the like).

The head-mountable device and/or the electronic device can detect the current alignment of the head-mountable device with respect to the face of the user (1104). For example, an eye sensor can detect an eye of the user and determine its location with respect to the head-mountable device. By further example, a pressure sensor of the head-mountable device can measure one or more forces applied to one or more regions of the face. Such regions can include a forehead, nose, and/or cheeks of the user. By further example, the detection of a current alignment can be performed by another electronic device, as described further herein.

The head-mountable device and/or the electronic device can compare the current alignment of the head-mountable device to a target alignment (1106). The target alignment can be one in which the components of the head-mountable device, such as the displays, are aligned (e.g., within a range) with features of the user's face, such as the eyes. Additionally or alternatively, the target alignment can be one in which the head-mountable device engages a face of the user with relatively greater comfort than is provided with other alignments. For example, in a target alignment the forces can be distributed in a manner that is evenly distributed and/or distributed according to the ability of the facial regions to withstand such forces.

Based on the current alignment, the target alignment, and the comparison there between, the head-mountable device and/or the electronic device can determine whether an adjustment is recommended and, if so, what adjustment is recommended (1108). For example, the head-mountable device and/or the electronic device can determine the change in position and/or orientation that would be required to change from the current alignment to the target alignment. In some embodiments, an adjustment can be to the frame, the light seal, the head engager, and/or another component of the head-mountable device. For example, the recommended adjustment can include tightening or loosening the head engager, which can alter the engagement of the light seal on the face of the user. Such a recommendation can be based, at least in part, on detections made by a head engagement sensor of the head engager.

Optionally, the determination of a recommended adjustment can be based, at least in part, on an operational mode and/or activity of the head-mountable device and/or the user. For example, the head-mountable device and/or the electronic device can recognize and/or provide an indication that an active operation, program, application, and/or activity involves a magnitude and/or type of movement by the user. A particular alignment and/or adjustment may be recommended to maintain engagement with the face of the user during such an operational mode. Accordingly, the head-mountable device and/or other device can determine the recommended alignment and/or adjustment for a duration of time (e.g., throughout the duration of the operational mode).

The head-mountable device and/or the electronic device can provide an output to a user based on the recommended adjustment, if any (1110). For example, the head-mountable device and/or the electronic device can provide a visual output on the displays, a sound, or other output that communicates to the user an indication of the recommended alignment and/or adjustment. The user can then take appropriate actions to effect the recommended adjustment. The output can include instructions for achieving the recommended adjustment, as described further herein.

Figure 12:
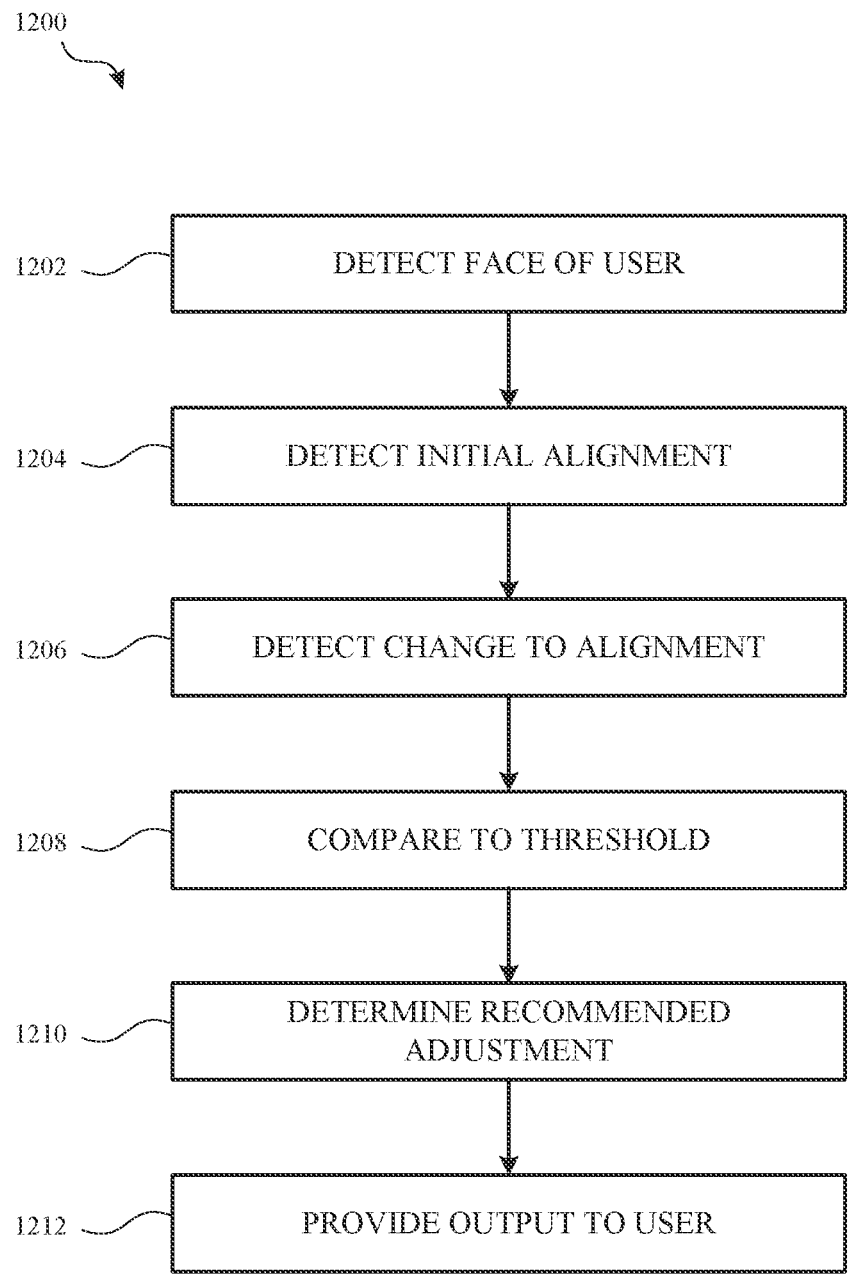
FIG. 12 illustrates a flow chart for a process having operations performed by a head-mountable device and/or an electronic device, according to some embodiments of the present disclosure.

FIG. 12 illustrates a flow diagram of an example process 1200 for guiding a user with adjustment assistance. For explanatory purposes, the process 1200 is primarily described herein with reference to the head-mountable device 100 of FIGS. 1, 3-6, and 8-10 and/or the electronic device 300 of FIGS. 2, 4, 5, and 7-10. However, the process 1200 is not limited to the head-mountable device 100 of FIGS. 1, 3-6, and 8-10 and/or the electronic device 300 of FIGS. 2, 4, 5, and 7-10, and one or more blocks (or operations) of the process 1200 may be performed by different components of the head-mountable device and/or one or more other devices. Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

The process 1200 can begin when the head-mountable device and/or an electronic device detects a face of a user (1202). Such a detection can be made by one or more sensors of the head-mountable device and/or the electronic device. Additionally or alternatively, the detection can be performed in response to an operational state of the head-mountable device (e.g., on/off state, application launch, user input command, and the like).

The head-mountable device and/or the electronic device can detect the initial alignment of the head-mountable device with respect to the face of the user (1204). For example, an eye sensor or other user sensor can detect an eye or other face portion of the user and determine its location with respect to the head-mountable device. By further example, the detection of a current alignment can be performed by another electronic device, as described further herein.

The head-mountable device and/or the electronic device can detect any changes to the alignment of the head-mountable device to a target alignment (1206). For example, the eye sensor or other user sensor can detect a change in the position and/or orientation of the head-mountable device with respect to the eye or other face portion. By further example, an IMU of the head-mountable device can track movement of the head-mountable device, which can be correlated to or otherwise used to check for a change of alignment with respect to the face. By further example, an electronic device can externally track movement of the head-mountable device.

Based on the initial alignment and any changes to the alignment, a comparison can be performed to determine the extent, magnitude, and/or frequency of adjustments within a period of time (1208). If the adjustments exceed a threshold and/or are within a threshold amount of time, it can be inferred that the user is excessively adjusting the head-mountable device. In such a condition, it can further be determined that a particular adjustment is appropriate to reduce the user's need to make frequent, manual adjustments.

The head-mountable device and/or the electronic device can determine whether an adjustment is recommended and, if so, what adjustment is recommended (1210). For example, the head-mountable device and/or the electronic device can determine the magnitude, extent, and/or frequency of manual adjustments are excessive. In some embodiments, a recommended adjustment can be to the frame, the light seal, the head engager, and/or another component of the head-mountable device. For example, the recommended adjustment can include tightening or loosening the head engager, which can alter the engagement of the light seal on the face of the user. Such a recommendation can be based, at least in part, on detections made by a head engagement sensor of the head engager.

Optionally, the determination of a recommended adjustment can be based, at least in part, on an operational mode and/or activity of the head-mountable device and/or the user. For example, the head-mountable device and/or the electronic device can recognize and/or provide an indication that an active operation, program, application, and/or activity involves a magnitude and/or type of movement by the user. A particular alignment and/or adjustment may be recommended to maintain engagement with the face of the user during such an operational mode. Accordingly, the head-mountable device and/or other device can determine the recommended alignment and/or adjustment for a duration of time (e.g., throughout the duration of the operational mode).

The head-mountable device and/or the electronic device can provide an output to a user based on the recommended adjustment, if any (1212). For example, the head-mountable device and/or the electronic device can provide a visual output on the displays, a sound, or other output that communicates to the user an indication of the recommended alignment and/or adjustment. The user can then take appropriate actions to effect the recommended adjustment. The output can include instructions for achieving the recommended adjustment, as described further herein.

Figure 13:
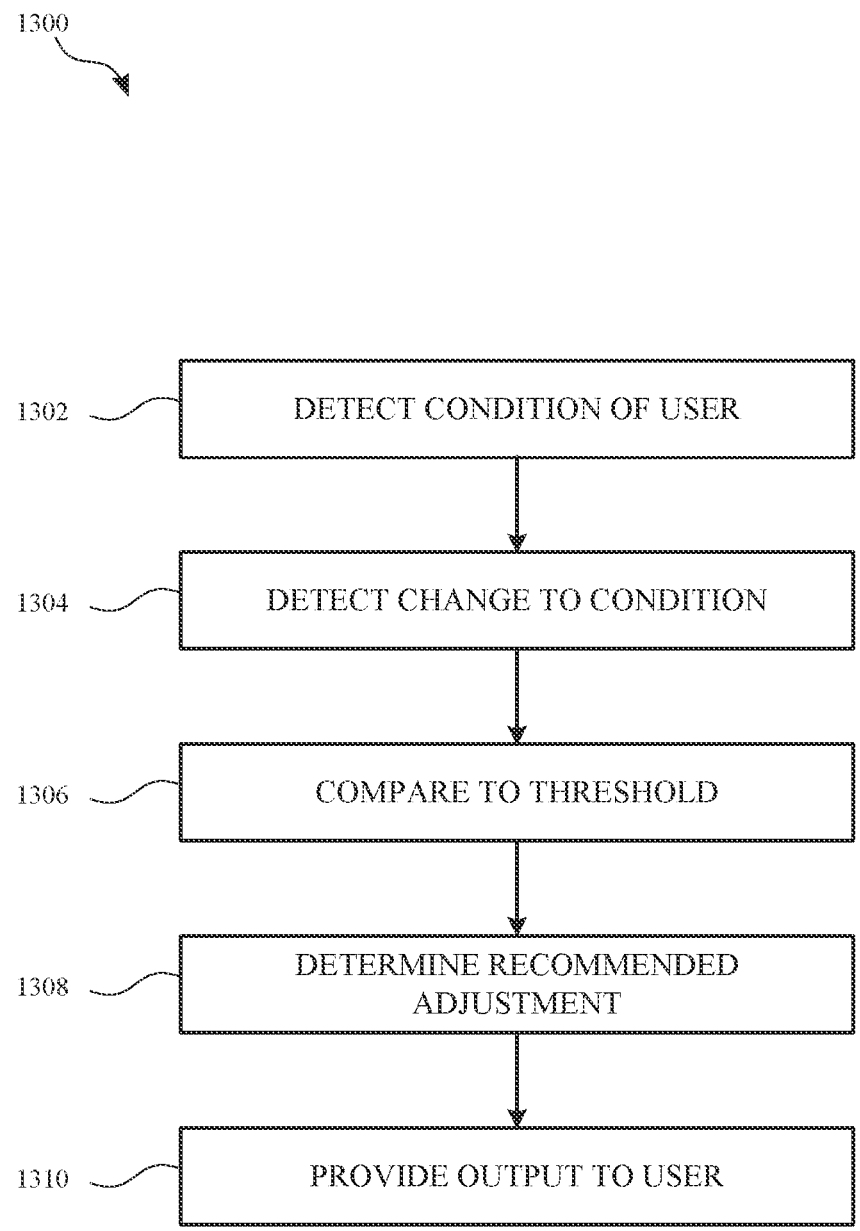
FIG. 13 illustrates a flow chart for a process having operations performed by a head-mountable device and/or an electronic device, according to some embodiments of the present disclosure.

FIG. 13 illustrates a flow diagram of an example process 1300 for guiding a user with adjustment assistance. For explanatory purposes, the process 1300 is primarily described herein with reference to the head-mountable device 100 of FIGS. 1, 3-6, and 8-10 and/or the electronic device 300 of FIGS. 2, 4, 5, and 7-10. However, the process 1300 is not limited to the head-mountable device 100 of FIGS. 1, 3-6, and 8-10 and/or the electronic device 300 of FIGS. 2, 4, 5, and 7-10, and one or more blocks (or operations) of the process 1300 may be performed by different components of the head-mountable device and/or one or more other devices. Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

The process 1300 can begin when the head-mountable device and/or an electronic device detects a condition of a user (1302). Such a detection can be made by one or more sensors of the head-mountable device and/or the electronic device. Such detections can include depth scanning, image capturing, thermal mapping, and the like. The head-mountable device and/or the electronic device can detect the initial condition with respect to a facial feature of the user. For example, a sensor can detect an eye, forehead, nose, ears, and/or cheeks of the user. Such detections can optionally be performed prior to application of a head-mountable device and/or while the head-mountable device is applied to the face of the user.

The head-mountable device and/or the electronic device can detect any changes to the condition of the user (1304). For example, the sensor can detect a change in the position, orientation, shape, temperature, or other condition of the user. Such changes can occur at the eye, forehead, nose, ears, and/or cheeks of the user, among other regions. Such detections can optionally be performed after application of a head-mountable device (e.g., while the head-mountable device is worn by the user) and/or after the head-mountable device is removed from the face of the user.

Based on the initial condition and any changes to the condition of the user, a comparison can be performed to determine the extent and/or magnitude of such changes (1306). If the changes (i.e., difference from initial condition to changed condition) exceed a threshold and/or endure for beyond a threshold amount of time, it can be inferred that the user is subject to excessive interactions with the head-mountable device. In such an event, it can further be determined that a particular adjustment is appropriate to enhance the user's comfort.

The head-mountable device and/or the electronic device can determine whether an adjustment is recommended and, if so, what adjustment is recommended (1308). For example, the head-mountable device and/or the electronic device can determine the magnitude and/or extent, and/or frequency of manual adjustments are excessive. In some embodiments, a recommended adjustment can be to the frame, the light seal, the head engager, and/or another component of the head-mountable device. For example, the recommended adjustment can include tightening or loosening the head engager, which can alter the engagement of the light seal on the face of the user. Such a recommendation can be based, at least in part, on detections made by a head engagement sensor of the head engager.

Optionally, the determination of a recommended adjustment can be based, at least in part, on an operational mode and/or activity of the head-mountable device and/or the user. For example, the head-mountable device and/or the electronic device can recognize and/or provide an indication that an active operation, program, application, and/or activity involves a magnitude and/or type of movement by the user. A particular alignment and/or adjustment may be recommended to maintain engagement with the face of the user during such an operational mode. Accordingly, the head-mountable device and/or other device can determine the recommended alignment and/or adjustment for a duration of time (e.g., throughout the duration of the operational mode).

The head-mountable device and/or the electronic device can provide an output to a user based on the recommended adjustment, if any (1310). For example, the head-mountable device and/or the electronic device can provide a visual output on the displays, a sound, or other output that communicates to the user an indication of the recommended alignment and/or adjustment. The user can then take appropriate actions to effect the recommended adjustment. The output can include instructions for achieving the recommended adjustment, as described further herein.

Figure 14:
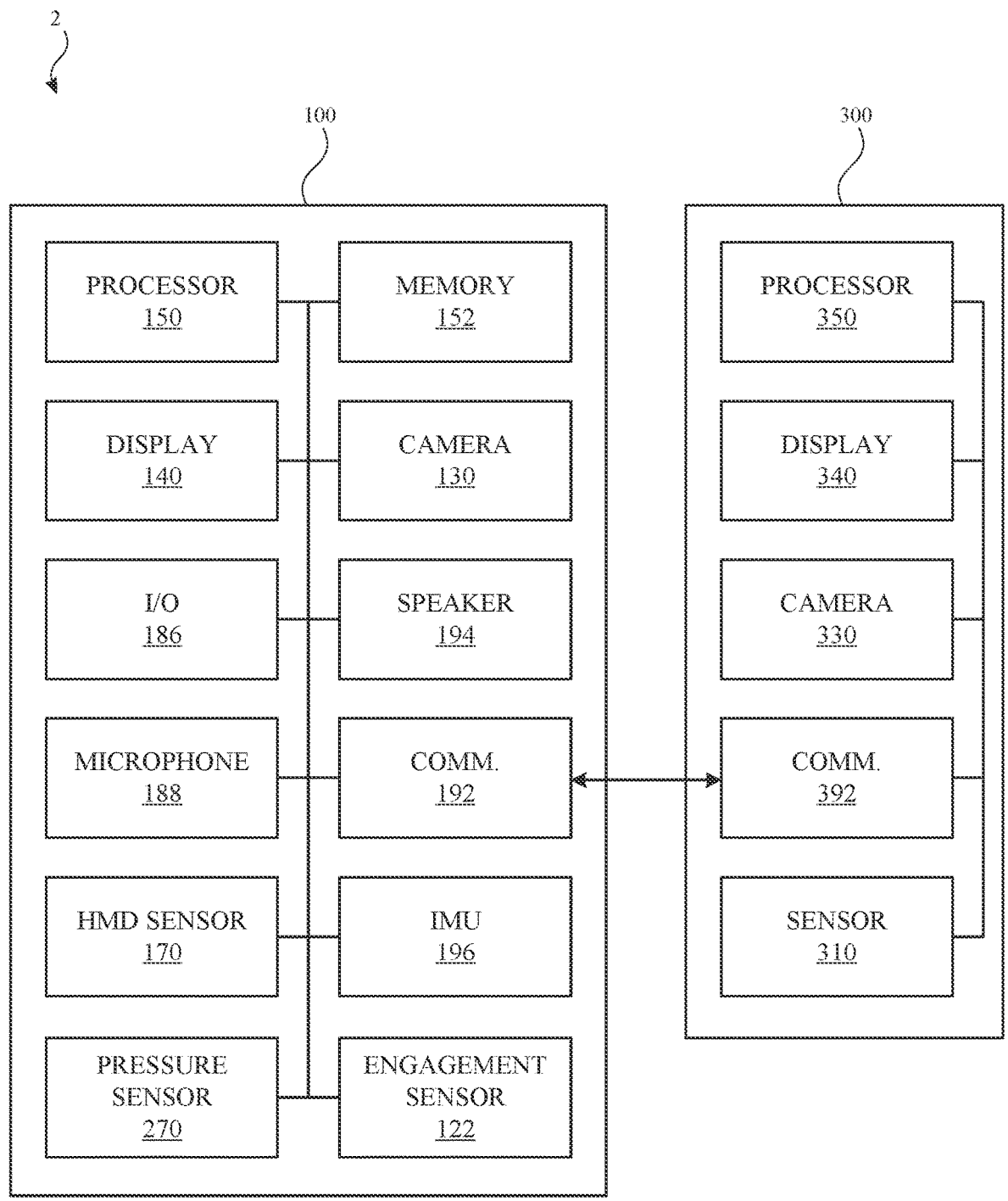
FIG. 14 illustrates a block diagram of a head-mountable device and an electronic device, in accordance with some embodiments of the present disclosure.

Referring now to FIG. 14, components of the head-mountable device can be operably connected to provide the performance described herein. FIG. 14 shows a simplified block diagram of an illustrative head-mountable device 100 and an electronic device 300 in accordance with one embodiment of the invention. It will be appreciated that components described herein can be provided on one, some, or all of an HMD module, a light seal, and/or a securement element. It will be understood that additional components, different components, or fewer components than those illustrated may be utilized within the scope of the subject disclosure.

As shown in FIG. 14, the head-mountable device 100 can include a processor 150 (e.g., control circuitry) with one or more processing units that include or are configured to access a memory 152 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 152 can store electronic data that can be used by the head-mountable device 100. For example, the memory 152 can store electrical data or content such as, for example, audio and video files, documents and applications, device settings and user preferences, timing and control signals or data for the various modules, data structures or databases, and so on. The memory 152 can be configured as any type of memory. By way of example only, the memory 152 can be implemented as random access memory, read-only memory, Flash memory, removable memory, or other types of storage elements, or combinations of such devices.

The head-mountable device 100 can further include a display 140 for displaying visual information for a user. The display 140 can provide visual (e.g., image or video) output. The display 140 can be or include an opaque, transparent, and/or translucent display. The display 140 may have a transparent or translucent medium through which light representative of images is directed to a user's eyes. The display 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display 140 for close up viewing. The optical subassembly can include one or more lenses, mirrors, or other optical devices.

The head-mountable device 100 can further include a camera 130 for capturing a view of an external environment, as described herein. The view captured by the camera can be presented by the display 140 or otherwise analyzed to provide a basis for an output on the display 140.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the processor 150 for detection of sound levels and communication of detections for further processing, as described further herein.

The head-mountable device 100 can include the speakers 190 as described herein. The speakers 190 can be operably connected to the processor 150 for control of speaker output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include one or more HMD sensors 170 that are operable to identify, detect, and/or measure multiple regions of the face 10, as described herein.

The head-mountable device 100 can include one or more pressure sensors 270 for detecting forces applied to regions of the face of the user, as described herein.

The head-mountable device 100 can include one or more head engagement sensor 122 for detecting tension in or another condition of the head engager 120, as described herein.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include the camera 130 which can capture image based content of the outside world.

The head-mountable device 100 can include a haptic device 194 that provides haptic feedback with tactile sensations to the user. The haptic device 194 can be implemented as any suitable device configured to provide force feedback, vibratory feedback, tactile sensations, and the like. For example, in one embodiment, the haptic device 194 may be implemented as a linear actuator configured to provide a punctuated haptic feedback, such as a tap or a knock.

The head-mountable device 100 can include a battery, which can charge and/or power components of the head-mountable device 100. The battery can also charge and/or power components connected to the head-mountable device 100.

A system 2 including the head-mountable device 100 can further include an electronic device 300. The electronic device 300 can facilitate alignment detection, provide outputs to a user, and/or operate in concert with the head-mountable device 100, as described herein.

The electronic device 300 can include a processor 350 (e.g., control circuitry) with one or more processing units that include or are configured to access a memory having instructions stored thereon. The instructions or computer programs may be configured to perform one or more of the operations or functions described with respect to the electronic device 300. The processor 350 can be implemented as any electronic device capable of processing, receiving, or transmitting data or instructions. For example, the processor 350 may include one or more of: a processor, a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The electronic device 300 can include one or more external sensors 310 that are operable to identify, detect, and/or measure multiple regions of the face 10 and/or a head-mountable device, as described herein. For example, the external sensors 310 can include a depth sensor, an IMU, and the like.

The electronic device 300 can include a display 340 for displaying visual information for a user. The display 340 can provide visual (e.g., image or video) output. The display 340 may utilize digital light projection, OLEDs, LEDs, uLEDs, liquid crystal on silicon, laser scanning light source, or any combination of these technologies.

The electronic device 300 can include one or more cameras 330. The cameras 330 can capture a view of the head-mountable device 100 and/or a user. The view captured by the camera 330 can be presented by the display 340 or otherwise analyzed to provide a basis for an output on the display 340.

The electronic device 300 can include a communication element 392 for communicating with one or more servers or other devices using any suitable communications protocol. For example, communication element 392 can support Wi-Fi (e.g., a 802.11 protocol), Ethernet, Bluetooth, high frequency systems (e.g., 1400 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. A communication element 392 can also include an antenna for transmitting and receiving electromagnetic signals.

Accordingly, embodiments of the present disclosure provide a head-mountable device and/or another electronic device can be operated to guide a user to position the head-mountable device in a manner that will achieve proper alignment of components with respect to the user and maximize user comfort. For example, the head-mountable device and/or another device can include sensors for detecting features of the user's face, forces distributed on the face when worn, and/or alignment with the face (e.g., eyes). By further example, the head-mountable device and/or another device can detect changes in adjustment and infer user discomfort based on the frequency and/or magnitude of such changes. By further example, the head-mountable device and/or another device can detect changes in features of the user's face before, during, and/or after use of the head-mountable device.

Various examples of aspects of the disclosure are described below as clauses for convenience. These are provided as examples, and do not limit the subject technology.

Clause A: a head-mountable device comprising: a sensor configured to detect movement of the head-mountable device with respect to a face; a processor configured to: determine whether the movement within a period of time exceeds a threshold; and if the movement within the period of time exceeds the threshold, output an instruction to adjust the head-mountable device.

Clause B: an electronic device comprising: a camera; a processor configured to: operate the camera to capture a first view of a feature of a face before an application of a head-mountable device; operate the camera to capture a second view of the feature of the face after the application of the head-mountable device; determine whether a difference between the feature in the first view and the feature in the second view exceeds a threshold; and if the difference exceeds the threshold, output an instruction to adjust the head-mountable device.

Clause C: a head-mountable device comprising: a frame; a head engager configured to secure the frame to a face; a first sensor supported by the frame and configured to detect a pressure between the frame and the face; a second sensor supported by the head engager and configured to detect a tension in the head engager; and a processor configured to: determine whether at least one of the pressure or the tension exceeds a threshold; and if at least one of the pressure or the tension exceeds the threshold, output an instruction to adjust the head-mountable device.

One or more of the above clauses can include one or more of the features described below. It is noted that any of the following clauses may be combined in any combination with each other, and placed into a respective independent clause, e.g., clause A, B, or C.

Clause 1: the sensor is an inertial measurement unit.

Clause 2: the sensor is a pressure sensor operable by the processor to detect pressure against the face.

Clause 3: the sensor is an eye sensor operable by the processor to capture a view of an eye.

Clause 4: a frame supporting the sensor and the processor; and a light seal for engaging the face, the light seal being removably coupled to the frame, wherein the instruction comprises an indication to replace the light seal with a different light seal.

Clause 5: a frame supporting the sensor and the processor; and a head engager configured to secure the frame to a head, wherein the instruction comprises an indication to adjust the head engager.

Clause 6: a depth sensor, wherein the processor is further configured to operate the depth sensor to detect a detected region of the face corresponding to the feature.

Clause 7: the processor is further configured to: detect whether the detected region of the face corresponding to the feature is a target region for engagement by the head-mountable device; and if the detected is not the target region, output the instruction to adjust the head-mountable device.

Clause 8: the head-mountable device comprises: a frame supporting a display; and a head engager configured to secure the frame to the face, wherein the processor is further configured to: detect an angle between the head engager and the frame; and if the angle is within an additional threshold, output the instruction to adjust the head-mountable device.

Clause 9: the processor is further configured to: a frame supporting a display; and a head engager configured to secure the frame to the face, wherein the processor is further configured to: detect a distance between the head engager and an ear; and if the distance is within an additional threshold, output the instruction to adjust the head-mountable device.

Clause 10: the difference between the feature in the first view and the feature in the second view comprises a difference in color.

Clause 11: the head-mountable device comprises: a frame supporting a display; and a light seal for engaging the face, the light seal being removably coupled to the frame, wherein the instruction comprises an indication to replace the light seal with a different light seal.

Clause 12: the head-mountable device comprises: a frame supporting a display; and a head engager configured to secure the frame to a head, wherein the instruction comprises an indication to adjust the head engager.

Clause 13: the first sensor is configured to detect a first pressure between the frame and a first region of the face; and the head-mountable device further comprises an additional sensor supported by the frame and configured to detect a second pressure between the frame and a second region of the face, wherein the processor is configured to output the instruction if a difference between the first pressure and the second pressure exceeds an additional threshold.

Clause 14: a camera configured to detect a feature of the face, wherein the processor is further configured to: operate the camera to capture a first view of the feature before an application of the head-mountable device; operate the camera to capture a second view of the feature after the application of the head-mountable device; determine whether a difference between the feature in the first view and the feature in the second view exceeds an additional threshold; and if the difference exceeds the additional threshold, output the instruction.

Clause 15: a light seal for engaging the face, the light seal containing the first sensor, the light seal being removably coupled to the frame.

Clause 16: the instruction comprises an indication to replace the light seal with a different light seal.

Clause 17: the instruction comprises an indication to adjust the head engager.

As described above, one aspect of the present technology may include the gathering and use of data. The present disclosure contemplates that in some instances, this gathered data may include personal information or other data that uniquely identifies or can be used to locate or contact a specific person. The present disclosure contemplates that the entities responsible for the collection, disclosure, analysis, storage, transfer, or other use of such personal information or other data will comply with well-established privacy policies and/or privacy practices. The present disclosure also contemplates embodiments in which users can selectively block the use of or access to personal information or other data (e.g., managed to minimize risks of unintentional or unauthorized access or use).

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An electronic device comprising:
    a camera;
    a processor configured to:
        operate the camera to capture a first view of a feature of a face before an application of a head-mountable device;
        operate the camera to capture a second view of the feature of the face after the application of the head-mountable device;
        determine whether a difference between the feature in the first view and the feature in the second view exceeds a threshold; and
        if the difference exceeds the threshold, output an instruction to adjust the head-mountable device.

2. The electronic device of claim 1, further comprising a depth sensor, wherein the processor is further configured to operate the depth sensor to detect a detected region of the face corresponding to the feature.

3. The electronic device of claim 2, wherein the processor is further configured to:
    detect whether the detected region of the face corresponding to the feature is a target region for engagement by the head-mountable device; and
    if the detected is not the target region, output the instruction to adjust the head-mountable device.

4. The electronic device of claim 1, wherein the head-mountable device comprises:
    a frame supporting a display; and
    a head engager configured to secure the frame to the face, wherein the processor is further configured to:
        detect an angle between the head engager and the frame; and
        if the angle is within an additional threshold, output the instruction to adjust the head-mountable device.

5. The electronic device of claim 1, wherein the processor is further configured to:
    a frame supporting a display; and
    a head engager configured to secure the frame to the face, wherein the processor is further configured to:
        detect a distance between the head engager and an ear; and
        if the distance is within an additional threshold, output the instruction to adjust the head-mountable device.

6. The electronic device of claim 1, wherein the difference between the feature in the first view and the feature in the second view comprises a difference in color.

7. The electronic device of claim 1, wherein the head-mountable device comprises:
    a frame supporting a display; and
    a light seal for engaging the face, the light seal being removably coupled to the frame, wherein the instruction comprises an indication to replace the light seal with a different light seal.

8. The electronic device of claim 1, wherein the head-mountable device comprises:
    a frame supporting a display; and
    a head engager configured to secure the frame to a head, wherein the instruction comprises an indication to adjust the head engager.

* * * * *